(12) United States Patent
Finnah

(10) Patent No.: US 11,426,948 B2
(45) Date of Patent: Aug. 30, 2022

(54) METHOD AND APPARATUS FOR PRODUCING A PLUG-THROUGH CONNECTION OF A PLURALITY OF CABLES OR HOSES THROUGH A PLASTIC COMPONENT

(71) Applicant: Robert Bosch GmbH, Stuttgart (DE)

(72) Inventor: Guido Bernd Finnah, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 17/261,079

(22) PCT Filed: Jun. 5, 2019

(86) PCT No.: PCT/EP2019/064645
§ 371 (c)(1),
(2) Date: Jan. 18, 2021

(87) PCT Pub. No.: WO2020/015916
PCT Pub. Date: Jan. 23, 2020

(65) Prior Publication Data
US 2021/0308952 A1    Oct. 7, 2021

(30) Foreign Application Priority Data
Jul. 17, 2018  (DE) ............... 10 2018 211 883.3

(51) Int. Cl.
*B29C 65/16* (2006.01)
*B29C 65/00* (2006.01)
(Continued)

(52) U.S. Cl.
CPC ...... *B29C 65/1635* (2013.01); *B29C 65/1661* (2013.01); *B29C 65/1667* (2013.01);
(Continued)

(58) Field of Classification Search
CPC ............ B29C 65/1635; B29C 65/1661; B29C 65/1667; B29C 66/5344; B29C 66/836;
(Continued)

(56) References Cited

U.S. PATENT DOCUMENTS

| 6,451,152 | B1 * | 9/2002 | Holmes | ............ B29C 66/91221 156/308.2 |
| 2011/0014731 | A1 * | 1/2011 | Nguyen | ............... H01L 51/5246 257/E33.056 |
| 2015/0128681 | A1 * | 5/2015 | Stier | ...................... B29C 70/84 73/23.31 |

FOREIGN PATENT DOCUMENTS

| DE | 10338732 |  | 3/2005 | |
| DE | 10338732 | A1 * | 3/2005 | ......... B29C 65/1635 |

(Continued)

OTHER PUBLICATIONS

Machine Translation of DE-10338732-A1 (Year: 2005).*
(Continued)

*Primary Examiner* — Daniel McNally
(74) *Attorney, Agent, or Firm* — Michael Best & Friedrich LLP

(57) ABSTRACT

The invention relates to a method and to an apparatus for producing a plug-through connection arrangement of a plurality of electrical cables (1*a*-1*d*) and/or fluid-conducting hoses, having a sheathing (2) consisting of a plastic, which extend, arranged adjacently spaced apart from each other, through associated openings (3*a*-3*d*) of a plastic component (4), comprising the following steps: providing (A) the plastic part (4) with the pre-produced plurality of openings (3*a*-3*d*), installing (B) the electrical cables (1*a*-1*d*) and/or fluid-conducting hoses through the associated openings (3*a*-3*d*), such that the outer wall of the sheathing (2), which consists of plastic, comes into contact with the inner wall of the respective openings (3*a*-3*d*) of the plastic component
(Continued)

(4), thermal welding (C) of the electrical cables (1a-1d) and/or fluid-conducting hoses to the plastic component (4) in the region of the respective opening (3a-3d), in order to produce an integrally sealing component bond, wherein at least two laser beam units (5a, 5b), positioned opposite each other, are aligned to an associated initial connection point, after which the oppositely positioned laser beam units (5a, 5b) are activated and caused to undergo a linear relative movement crosswise to the orientation of the openings (3a-3d), in order to create the integral bond by surface melting of the sheathing (2) together with the plastic component (4).

10 Claims, 3 Drawing Sheets

(51) Int. Cl.
| | | |
|---|---|---|
| | *F16L 5/02* | (2006.01) |
| | *H02G 1/14* | (2006.01) |
| | *B29L 23/00* | (2006.01) |
| | *B29L 31/34* | (2006.01) |
| | *H02G 15/013* | (2006.01) |

(52) U.S. Cl.
CPC ........ B29C 66/5344 (2013.01); B29C 66/836 (2013.01); F16L 5/022 (2013.01); H02G 1/14 (2013.01); *B29L 2023/005* (2013.01); *B29L 2031/3462* (2013.01); *H02G 15/013* (2013.01)

(58) Field of Classification Search
CPC .... F16L 5/022; H02G 1/14; B29L 3031/3462; B29L 2023/3462
See application file for complete search history.

(56) References Cited

FOREIGN PATENT DOCUMENTS

| | | |
|---|---|---|
| DE | 102012207762 | 11/2013 |
| DE | 102016212690 | 1/2018 |
| WO | 2017199938 | 11/2017 |

OTHER PUBLICATIONS

International Search Report for Application No. PCT/EP2019/064645 dated Aug. 12, 2019 (English Translation, 2 pages).

* cited by examiner

METHOD AND APPARATUS FOR PRODUCING A PLUG-THROUGH CONNECTION OF A PLURALITY OF CABLES OR HOSES THROUGH A PLASTIC COMPONENT

BACKGROUND OF THE INVENTION

The present invention relates to a method for producing a plug-through connection arrangement of a plurality of electrical cables and/or fluid-conveying hoses, which have an encapsulation consisting of a plastic and which extend through respectively assigned openings of a plastic component while being arranged at a distance next to one another. The invention furthermore relates also to a laser beam device for producing thermal welding which is carried out in connection with this method.

The field of use of the invention preferably extends to motor vehicle technology and furthermore also to other application fields in which a plurality of electrical cables or fluid-conveying hoses are to be fed through or fed into a component, for example an equipment housing, a tank container or a pipeline, in a sealed manner. Such electrical cables may for example be current-carrying cables of an electrical energy supply, sensor cables or the like. Fluid-conveying hoses may for example be water lines, pneumatic connection lines or the like. The electrical cables and fluid-conveying hoses have the common feature that they are provided with a thermoplastic encapsulation made of plastic in order to serve primarily as electrical insulation or corrosion protection. In the case of fluid-conveying hoses, the function of the encapsulation may also simultaneously include the conducting function. The plastic component which such electrical cables or fluid-conveying hoses are intended to be fed through or into in a sealed manner in the scope of the plug-through connection in question here consists of a thermoplastic material.

The generally known prior art discloses single plug-through connections for electrical cables or fluid-conveying hoses into a plastic housing or the like, which are welded in a leaktight manner by radial laser welding processes. By the material connection caused by means of surface fusion at the connection position, fixing as well as sealing are thus achieved. In this case, either the plastic component rotates in the laser beam or the laser beam rotates around the connection position as a result of corresponding deflection optics. For this type of connection, it is advantageous if quasi-simultaneous welding is carried out, i.e. the entire connection position is not irradiated at the same time, but instead the laser beam is scanned over it several times in alternation so that the connection position is heated and welded almost simultaneously. However, a situation in which a second or further plug-through connection is intended to be produced directly next to the single plug-through connection produced in this way proves problematic since the laser light of the laser beam unit cannot be guided unimpededly radially onto the connection position. The same situation arises when a single plug-through connection is intended to extend directly next to a shadowing attached part.

DE 10 2012 207 762 A1 discloses a suitable technical solution for producing such a multiple plug-through connection of electrical lines preferably arranged in a row, which is based on another technology. In order to feed a plurality of electrical connection cables into the housing of an exhaust gas sensor in a sealed manner and fasten them thereon, it is proposed to fill an opening cross section for feeding the connection cables in with a thermoplastic material containing fluoropolymer. Specifically, in a preferred exemplary embodiment, to this end a pot-shaped guiding piece made of steel is used, the bottom region of which has openings for respectively fitting a connection cable through. The edge region of the sensor housing, which forms the opening, protrudes into the interior of the pot-shaped guiding piece. Said thermoplastic material is placed and liquefied in the intermediate space. The sealed multiple plug-through connection, which at the same time also closes the housing opening in a sealed manner, is obtained after hardening. However, the different types of successive method steps lead to a very high production outlay.

SUMMARY OF THE INVENTION

The object of the present invention is therefore to further improve a plug-through connection arrangement for preferably a plurality of electrical cables or fluid-conveying hoses of the generic type, in such a way that simple and rapid manufacture becomes possible, which is distinguished by reliable sealing between the connection partners.

The object is achieved by a method according to the invention, by a plug-through connection arrangement thereby formed, and by a special laser welding device for producing the plug-through connection arrangement according to the invention.

The invention includes the technical teaching that the production of a multiple plug-through connection arrangement of the type described above requires a plastic component which is initially to be provided with a plurality of prefabricated openings. The openings may, for example, be produced by injection-molding technology or prepared by machining, for example by boring technology. The electrical cables and/or fluid-conveying hoses are subsequently mounted into the respectively associated openings, i.e. fitted through, so that the outer wall of the encapsulation consisting of plastic comes into contact with the inner wall of the respective openings of the plastic component. To this end, the electrical cables or fluid-conveying hoses are intended to form a snug fit in relation to the openings assigned to them. Finally, the electrical cables or fluid-conveying hoses are thermally welded to the plastic component in the region of the respective opening in order to produce a material sealing component connection, by:

at least two laser beam units positioned opposite one another being aimed at a respectively assigned initial connection position, after which the opposing laser beam units are activated and set in a linear relative movement transversely with respect to the extent direction of the openings, i.e. in the cross-sectional direction, in order to provide the material connection by surface fusion of the thermoplastic encapsulation to the thermoplastic material component.

The advantage of the solution according to the invention is, in particular, that welding is carried out in a time-saving manner simultaneously from two mutually opposing laser beam units, between which the component is located. In this way, each position of the surrounding opening can be furthermore reached without the tool or the workpiece having to carry out a rotational movement. The solution according to the invention therefore overcomes the preconception that such welding by a laser beam should be possible only with a device which ensures an equidistant spacing between the laser beam unit and the welding position. On the basis of this realization, it is now also possible to solve the shadowing problem discussed in the introduction in the case of a plurality of electrical cables or fluid-conveying hoses lying next to one another, so that such multiple plug-through connections are also compatible with laser welding technology.

Preferably, the plastic component consists of a transparent or translucent thermoplastic material and therefore transmits light in order to deliver the laser beam through at least partially, i.e. to cause only slight refraction and scattering of the light. In this way, welding is not restricted merely to the externally accessible edge region of the openings, but may also take place in the inner-lying lateral region.

In order to achieve a production time which is as short as possible, it is proposed that the opposing laser beam units are moved preferably synchronously in a linear direction X along the plastic component. By this simultaneity, the sealed multiple plug-through connection can be provided in one run.

According to one preferred embodiment for carrying out the method according to the invention, it is proposed that the mutually opposing laser beam units are moved parallel to the statically clamped plastic component. As an alternative, however, it is also conceivable for the plastic component to be moved between mutually opposing static laser beam units. One of the two alternatives may be employed, depending on the dimensions and weight of the workpiece in relation to the tool.

According to one preferred exemplary embodiment of a material pairing for the solution according to the invention, it is proposed that the encapsulation consists of a plastic material selected from a group consisting of polyamide (PA), polyethylene (PE), polypropylene (PP), polyvinyl chloride (PVC), thermoplastic elastomers (TPE), polyethylene terephthalate (PET), fluorinated ethylene propylene (FEP), polytetrafluoroethylene (PTFE) and the like, while the plastic component is produced from the same material or a material which can be welded thereto.

According to one measure which further improves the invention, it is proposed that the outer contour profile of the plastic component in the region of the openings is matched to the latter in such a way that there are approximately equal wall thicknesses at least in the beam path of the laser beam unit. Thus, the outer contour profile of the plastic component may for example be configured to be correspondingly undulating. This measure is based on the discovery that the wall thickness of the transparent to translucent material of the plastic component should not vary too greatly in order to allow reliable laser welding. This requirement may be satisfied by a design adaptation of the component shape. The plastic component is to this extent designed optimally for production.

By the transparent to translucent material of the plastic component, the laser light is scattered strongly in such a way that, even with directly opposite positioning of the laser optics of the two laser beam units, one set of laser optics and also the pyrometer measurement, preferably integrated therein, of the surface temperature is not influenced by the opposite laser optics. The pyrometer measurement is used to regulate the laser welding process in a generally known way.

According to another measure which further improves the invention, it is proposed that mutually opposing end sections, which have a thickness D1 that is narrower than the component thickness D2 in the region of the openings, are arranged on the plastic component in continuation of a row of openings for electrical cables or fluid-conveying hoses to be led through. These opposing end sections are also used for a component design which is optimal for production, in order to prevent the laser optics of the mutually opposing laser beam units from damaging one another in an entry and exit phase of the laser welding.

BRIEF DESCRIPTION OF THE DRAWINGS

Further measures which improve the invention will be presented in more detail below together with the description of preferred statement examples of the invention with the aid of the figures.

In the drawings.

DETAILED DESCRIPTION

Figure 1:
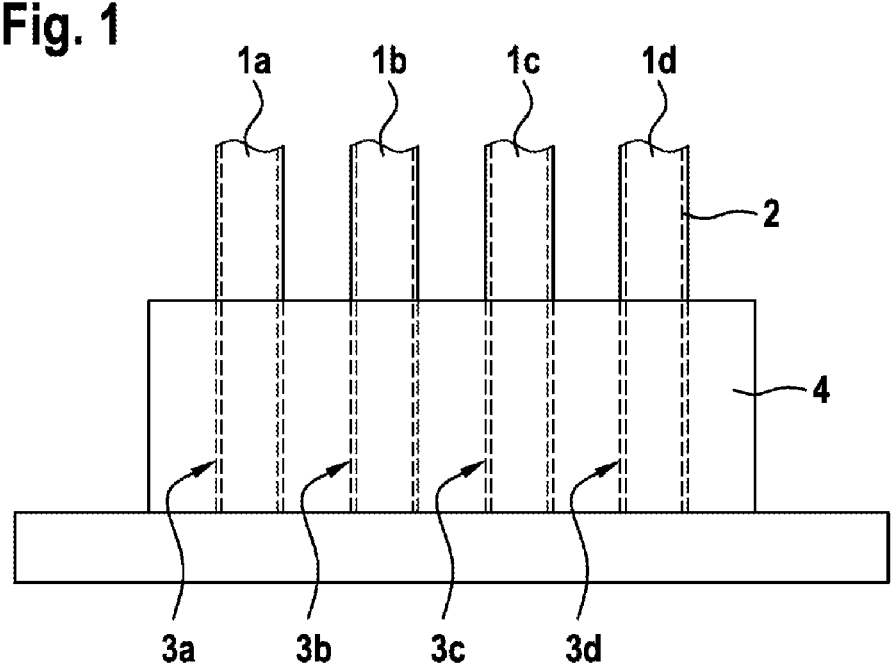
FIG. 1 shows a schematic side view of a multiple plug-through connection arrangement for electrical cables.
Figure 2:
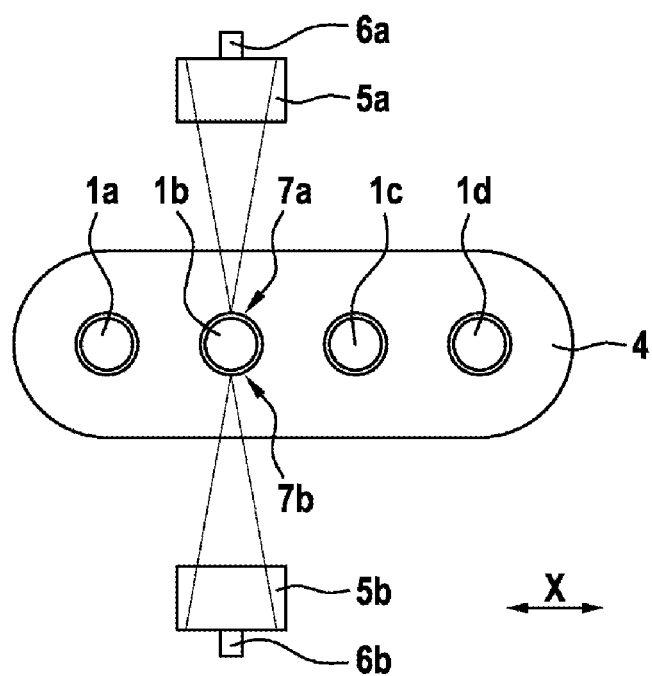
FIG. 2 shows a schematic plan view of a first exemplary embodiment for a component configuration which is optimal for production.

According to FIG. 1, an exemplary multiple plug-through connection arrangement consists of a plurality of electrical cables 1a to 1d, which are respectively provided with an encapsulation 2 consisting of thermoplastic material. The individual electrical cables 1a to 1d are arranged at a distance next to one another and are fed through respectively assigned openings 3a to 3d of a transparent thermoplastic plastic component 4.

In order to produce thermal welding of the electrical cables 1a to 1d to the plastic component 4, a laser welding device, which essentially comprises a pair of oppositely positioned laser beam units 5a and 5b, is used. The two opposing laser beam units 5a and 5b respectively radiate through the transparent material of the plastic component 4 and are in this case focused by way of example on the two sides of the electrical cable 1b, in order to thermally weld the electrical cable 1b to the plastic component 4 at this connection position so that a materially sealing component connection is formed. In order to connect all the electrical cables 1a to 1d to the plastic component 4 in this way, the laser beam units 5a and 5b are moved synchronously in a linear direction X along the plastic component 4. In this case, the mutually opposing laser beam units 5a and 5b move parallel to the statically clamped plastic component 4.

The laser welding device furthermore comprises in each case a pyrometer measuring instrument 6a and 6b which is assigned to the two laser beam units 5a and 5b and which measures the surface temperature at the current connection position 7a or 7b in accordance with the generally known measurement principle, in order to drive the assigned laser beam units 5a and 5b, respectively, in a regulated manner. The regulation is carried out to a material-dependently adjusted setpoint temperature at the connection positions 7a and 7b, in order to generate local fusion of the plastic material there so as to produce the desired material connection.

Figure 3:
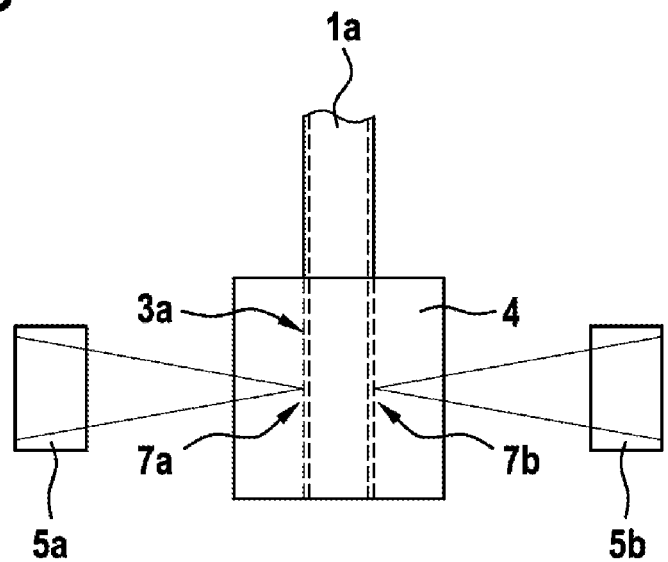
FIG. 3 shows a schematic side view of an end side of the multiple plug-through connection arrangement according to FIG. 1 and FIG. 2.

FIG. 3 illustrates in the side view that the pair of oppositely positioned laser beam units 5a and 5b as a tool are aimed at a respectively assigned initial connection position 7a and 7b, lying at the same height, of the plastic component 4 as a workpiece.

Figure 4:
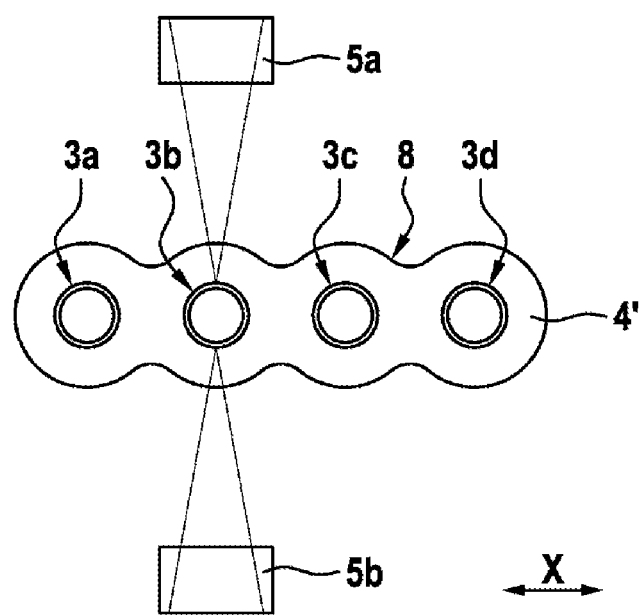
FIG. 4 shows a schematic plan view of a second exemplary embodiment for a component configuration which is optimal for production.

According to the exemplary embodiment represented in FIG. 4, the outer contour profile 8 of the plastic component 4' is configured in an undulating shape in the region of the openings 3a to 3d, so that there are approximately equal wall thicknesses at least in the beam path of the laser beam units 5a and 5b. In this way, sufficiently uniform fusion of the plastic material to produce the material connection is ensured.

Figure 5:
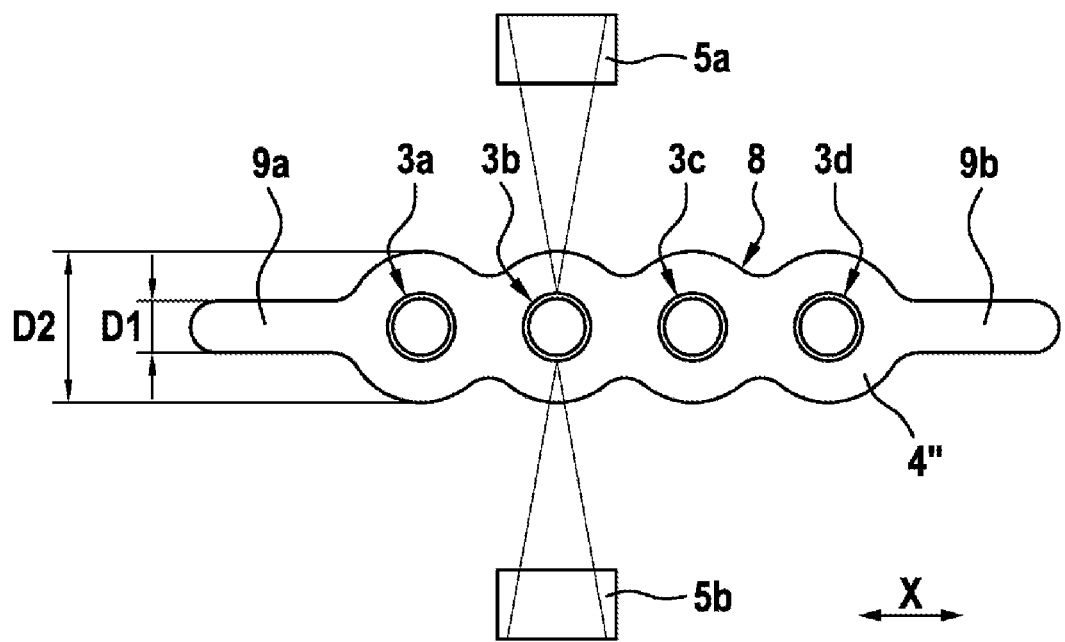
FIG. 5 shows a schematic plan view of a third exemplary embodiment for a component configuration which is optimal for production.

According to the further exemplary embodiment represented in FIG. 5, mutually opposing end sections 9a and 9b are integrally formed on the plastic component 4" in continuation of the row of openings 3a to 3d. The two end sections 9a and 9b have a thickness D1 that is narrower than the component thickness D2 for welding along the linear direction X. The two end sections 9a and 9b are used as entry and exit sections for the laser welding device. When the latter moves along the plastic component 4", the activation and deactivation of the laser beam respectively take place in the region of the end sections 9a and 9b, so that mutual damage to the mutually opposing laser beam units 5a and 5b is avoided.

Figure 6:
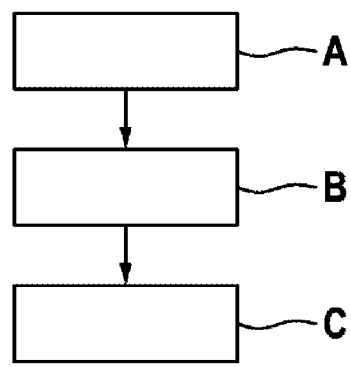
FIG. 6 shows a schematic flowchart of a method for producing a multiple plug-through connection arrangement.

According to FIG. 6, with the laser welding device described above, the multiple plug-through connection arrangement to which the invention relates is produced according to one of the three exemplary embodiment examples described above, in that provision A of the plastic component 4 having the prefabricated plurality of openings 3a to 3d is first carried out in an initial step.

In a mounting production step B following on from this, the electrical cables 1a to 1d are fitted through openings 3a to 3d assigned to them. In this case, the component dimensions are selected in such a way that the components mounted with one another come into contact with one another.

In a subsequent production step, thermal welding C of the electrical cables to the plastic component is carried out in the region of the respective opening in order to produce the materially sealing component connection, wherein the laser beam units positioned opposite one another are activated and moved in a linear travel direction along the row of openings 3a to 3d, so that the material connection is formed after cooling by surface fusion of the materials to be connected to one another.

The invention is not restricted to the preferred exemplary embodiments described above. Rather, modifications thereof which are also included in the protective scope of the following claims may also be envisioned. Instead of a multiplicity of electrical cables or fluid-conveying hoses, for example, it is thus also possible to also combine only a single component of this type with a plastic component to form a plug-through connection arrangement of the type according to the invention. This may, in particular, be carried out when a shadowing component, which does not allow a rotational tool movement, is arranged directly next to the electrical cable to be mounted or the fluid-conveying hose. Furthermore, it is also conceivable to carry out quasi-simultaneous welding by multiple scanning of the connection positions.

The invention claimed is:

1. A method for producing a plug-through connection arrangement of a plurality of electrical cables (1a-1d) and/or fluid-conveying hoses, which have a plastic encapsulation (2) and which extend through respectively assigned openings (3a-3d) of a plastic component (4, 4', 4") while being arranged at a distance next to one another, the method comprising the following steps:
- providing (A) the plastic component (4, 4', 4") having the prefabricated plurality of openings (3a-3d),
- mounting (B) the electrical cables (1a-1d) and/or fluid-conveying hoses through the respectively assigned openings (3a-3d) so that an outer wall of the plastic encapsulation (2) comes into contact with an inner wall of respective openings (3a-3d) of the plastic component (4, 4', 4"),
- thermally welding (C) the electrical cables (1a-1d) and/or fluid-conveying hoses to the plastic component (4, 4', 4") in a region of the respective openings (3a-3d) in order to produce a materially sealing component connection, by:
- at least two laser beam units (5a, 5b) positioned opposite one another being aimed at a respectively assigned initial connection position, after which
- the opposing laser beam units (5a, 5b) are activated and set in a linear relative movement transversely with respect to an extent direction of the openings (3a-3d) in order to provide the materially sealing connection by surface fusion of the encapsulation (2) to the plastic component (4, 4', 4").

2. The method as claimed in claim 1, characterized in that a outer contour profile (8) of the plastic component (4', 4") in the region of the openings (3a-3d) is matched to the latter in such a way that there are approximately equal wall thicknesses at least in a beam path of the laser beam units (5a, 5b).

3. The method as claimed in claim 2, characterized in that the outer contour profile (8) of the plastic component (4', 4") is configured in an undulating shape.

4. The method as claimed in claim 2, characterized in that mutually opposing end sections (9a, 9b), which have a thickness (D1) that is narrower than a component thickness (D2) in the region of the openings (3a-3d), are arranged on the plastic component (4") in continuation of a row of openings (3a-3d).

5. The method as claimed in claim 1, characterized in that the plastic component (4, 4', 4"), at least in a region of penetration positions, transmits light in order to deliver the laser beam emitted by the laser beam units (5a, 5b) through at least partially.

6. The method as claimed in claim 1, characterized in that the opposing laser beam units (5a, 5b) move synchronously in a linear direction (X) along the plastic component (4, 4', 4").

7. The method as claimed in claim 1, characterized in that the plastic component (4, 4', 4") is static and the opposing laser beam units (5a, 5b) are moved parallel to the static plastic component (4, 4', 4").

8. The method as claimed in claim 1, characterized in that the laser beam units (5a, 5b) are static and the plastic component (4, 4', 4") is moved between the opposing static laser beam units (5a, 5b).

9. The method as claimed in claim 1, characterized in that the encapsulation (2) is made of a plastic material selected from a group consisting of polyamide (PA), polyethylene (PE), polypropylene (PP), polyvinyl chloride (PVC), thermoplastic elastomers (TPE), polyethylene terephthalate (PET), fluorinated ethylene propylene (FEP), polytetrafluoroethylene (PTFE), while the plastic component (4, 4', 4") is produced from the same material or a material which can be welded thereto.

10. The method as claimed in claim 1, characterized in that the plastic component (4, 4', 4"), at least in a region of penetration positions, transmits light and is made of a transparent or translucent thermoplastic material in order to deliver the laser beam emitted by the laser beam units (5*a*, 5*b*) through at least partially.

\* \* \* \* \*